United States Patent
Sakurada

(10) Patent No.: US 7,859,409 B2
(45) Date of Patent: Dec. 28, 2010

(54) ELECTRONIC APPARATUS AND COMPUTER-READABLE MEDIUM CONTAINING PROGRAM FOR IMPLEMENTING CONTROL METHOD THEREOF

(75) Inventor: Shinya Sakurada, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 835 days.

(21) Appl. No.: 11/726,662

(22) Filed: Mar. 21, 2007

(65) Prior Publication Data

US 2007/0225831 A1    Sep. 27, 2007

(30) Foreign Application Priority Data

Mar. 22, 2006  (JP) ............................ 2006-079348
Mar. 22, 2006  (JP) ............................ 2006-079349

(51) Int. Cl.
*G08B 13/14* (2006.01)

(52) U.S. Cl. .............. 340/572.1; 340/572.3; 340/572.7; 340/572.8; 340/5.1; 340/636.1; 235/380; 235/381; 235/382; 235/462.15; 434/317; 434/318; 434/319; 84/174; 84/477 R; 84/601; 84/615; 84/737

(58) Field of Classification Search ............. 340/572.1, 340/572.3, 572.7, 572.8, 5.1, 636.1; 235/380, 235/381, 392, 462.15; 434/317, 318, 319; 84/174, 477 R, 601, 615, 737
See application file for complete search history.

(56) References Cited

U.S. PATENT DOCUMENTS 6,426,455 B2 * 7/2002 Hasegawa ................. 84/470 R
2003/0196542 A1   10/2003 Harrison

FOREIGN PATENT DOCUMENTS

JP    2005-004082    1/2005

* cited by examiner

*Primary Examiner*—Tai T Nguyen
(74) *Attorney, Agent, or Firm*—Morrison & Foerster LLP

(57) ABSTRACT

An electronic apparatus which allows even a visually-handicapped user to perceive the function or state related to an operating element in advance. When an operator makes a RF tag mounted in a predetermined portion of the human body operating an operating element approach the operating element and then a RFID reader reads an ID stored in the RF tag, the function of the operating element or the state corresponding to the operating element is notified to the operator through voice in accordance with the read ID.

13 Claims, 6 Drawing Sheets

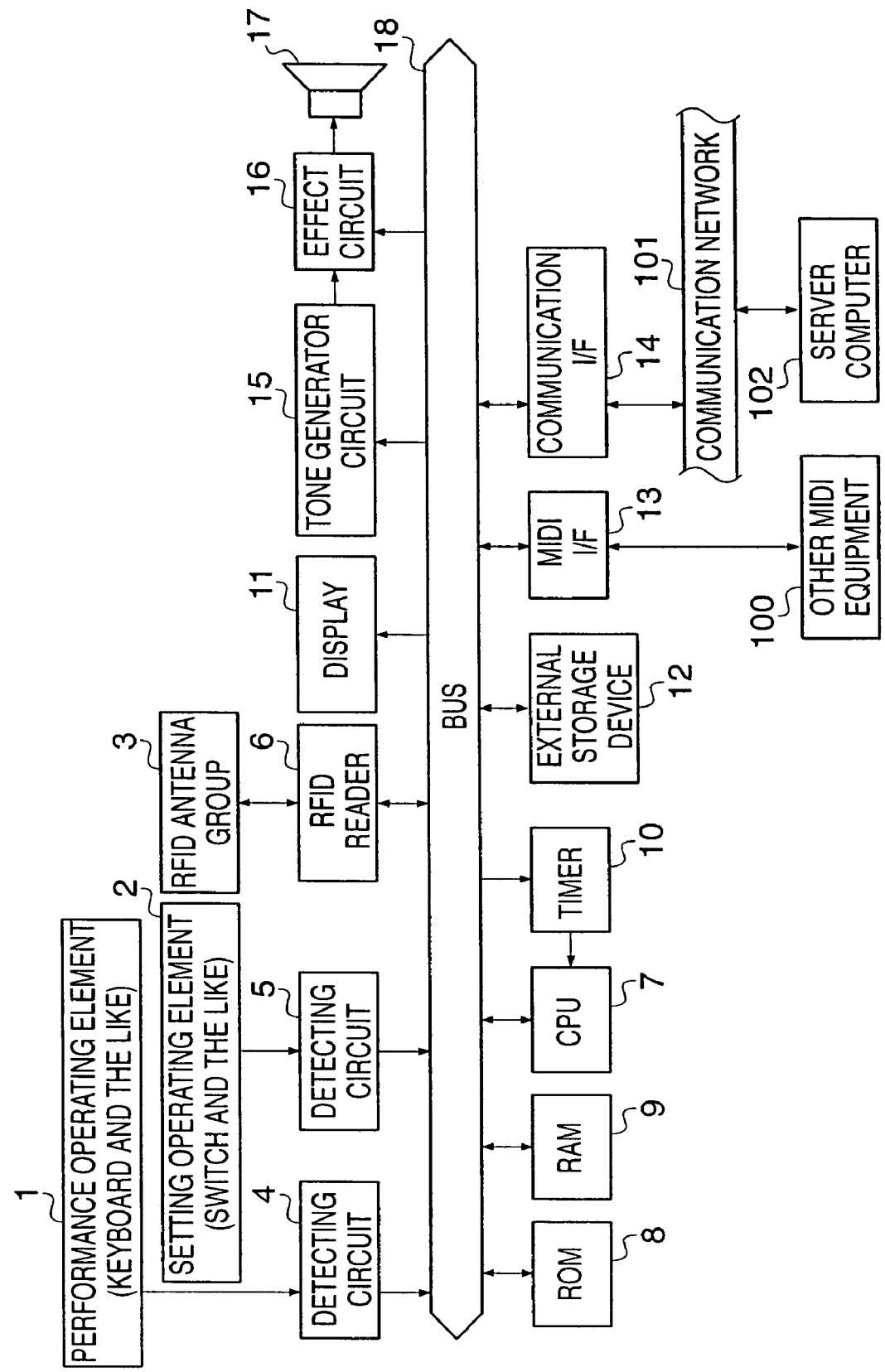

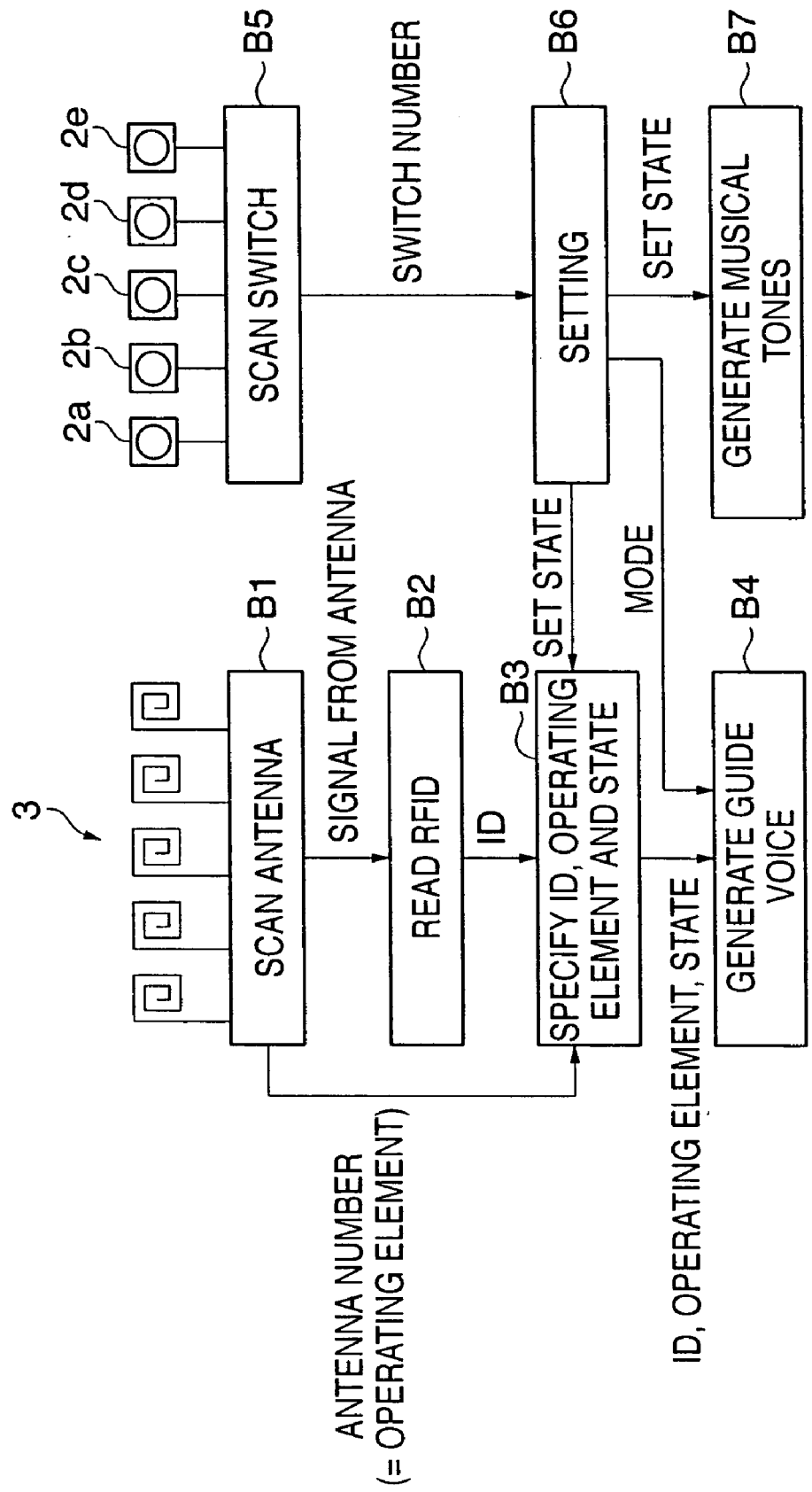

ELECTRONIC APPARATUS AND COMPUTER-READABLE MEDIUM CONTAINING PROGRAM FOR IMPLEMENTING CONTROL METHOD THEREOF

BACKGROUND OF THE INVENTION

1. Field of the Invention

The present invention relates to an electronic apparatus provided with many operating elements, and a computer-readable medium containing a program for implementing a control method of the electronic apparatus.

2. Description of the Related Art

Electronic apparatuses provided with many operating elements have hitherto been known in general.

As the electronic apparatus like this, there has been an electronic musical instrument provided with many tone color selecting switches (for example, refer to Japanese Patent Laid-Open No. 2005-4082). In this conventional electronic musical instrument, when the user operates one tone color selecting switch to select one tone color, a state is obtained in which musical tones having the selected tone color can be generated. That is, the tone color selecting switch corresponding to the selected tone color changes to a "valid" state; the other tone color selecting switches change to an "invalid" state.

Also, in electronic musical instruments of conventional art, there is generally used a construction which assigns many functions to one operating element and thereby allows the one operating element to be shared by many functions. For example, to an increment/decrement switch, there is assigned a function of increasing/decreasing the tempo of automatic performance when a tempo setting mode is selected; there is assigned a function of increasing/decreasing the volume of automatic performance when a volume setting mode is selected.

Further, in the ordinary electronic apparatuses provided with many operating elements, the name of assigned function is usually displayed (printed) in the vicinity of each operating element to indicate what type of function has been assigned to each operating element. And when the user operates an operating element and thus the operative state of the electronic apparatus is changed, that state is usually displayed on a display. In this manner, an arrangement is made so that the function or state of an operating element attracts user's visual attention.

However, in the above described electronic apparatuses of conventional art, the function or state of an operating element is visually displayed, so it is difficult for a visually-handicapped user to perceive the function or state of an operating element before operating the operating element. Even the user like this may perceive the function or state related to an operating element only after the operating element has been operated. However, when an operating element is operated, the state of the electronic apparatus also changes (for example, in the above described electronic musical instrument of conventional art, the tone color or tempo changes); accordingly, when the user does not desire the change of state of the electronic apparatus, this is significantly inconvenient.

SUMMARY OF THE INVENTION

The present invention provides an electronic apparatus allowing even a visually-handicapped user to perceive the function or state related to an operating element in advance, and a computer-readable medium containing a program for implementing a control method of the electronic apparatus.

To attain the above object, in a first aspect of the present invention, there is provided an electronic apparatus comprising at least one operating element, a RFID reading device including a RFID reader antenna arranged in the vicinity of the operating element, and a notification device by which, when an operator makes a RF tag mounted in a predetermined portion of the human body operating the operating element approach the operating element and then the RFID reading device reads an ID stored in the RF tag, the function of the operating element or the state corresponding to the operating element is notified to the operator through voice in accordance with the read ID.

With the construction of the electronic apparatus according to the first aspect of the present invention, when an operator makes a RF tag mounted in a predetermined portion of the human body operating the operating element approach the operating element and then the RFID reading device reads an ID stored in the RF tag, the function of the operating element or the state corresponding to the operating element is notified to the operator through voice in accordance with the read ID. Accordingly, even a visually-handicapped user can perceive the function or state of an operating element in advance. In checking an operating element, the user does not actually operate the operating element, so no undesired change of state of the electronic apparatus occurs.

In the electronic apparatus the notification device can perform notification through voice of a type different for each read ID.

With the construction of the preferred embodiment of the present invention, the function of the operating element or the state corresponding to the operating element is notified through voice of a type different for each read ID. Accordingly, at least one of, for example, sound quality, language and notification content can be changed for each ID.

The electronic apparatus can further comprise a selecting device configured to select one from among a plurality of modes, wherein the notification device performs notification through voice of a type different for each mode selected by the selecting device.

With the construction of the preferred embodiment of the present invention, the function of the operating element or the state corresponding to the operating element is notified through voice of a type different for each selected mode. Accordingly, at least one of, for example, sound quality, language and notification content can be changed for each mode.

To attain the above object, in a second aspect of the present invention, there is provided an electronic apparatus comprising a plurality of operating elements, a plurality of RFID reader antennas provided in each of the plurality of operating elements, and one RFID reader that scans on a time-division basis each of the plurality of RFID reader antennas and thereby reads the operating element approached by a RF tag and IDs stored in the RF tag.

With the construction of the electronic apparatus according to the second aspect of the present invention, one RFID reader scans on a time-division basis each of the plurality of RFID reader antennas provided respectively in the plurality of operating elements, whereby the operating element approached by the RF tag and IDs stored in the RF tag are read. Accordingly, the RF tag can be detected by the one RFID reader at positions corresponding respectively to the plurality of operating elements, thereby allowing simplification of the construction of the electronic apparatus.

To attain the above object, in a third aspect of the present invention, there is provided an electronic apparatus comprising at least one operating element provided with a RF tag, a RFID reading device including a RFID reader antenna mounted in a predetermined portion of the human body operating the operating element, and a notification device by which, when an operator makes the RFID reading device approach the operating element and then the RFID reading device reads an ID stored in a RF tag included in the operating element, the function of the operating element or the state corresponding to the operating element is notified through voice to the operator in accordance with the read ID.

With the construction of the electronic apparatus according to the third aspect of the present invention, when an operator makes the RFID reading device including a RFID reader antenna mounted in a predetermined portion of the human body operating at least one operating element provided with the RF tag approach the operating element and then the RFID reading device reads an ID stored in the RF tag included in the operating element, the function of the operating element or the state corresponding to the operating element is notified through voice to the operator in accordance with the read ID. Accordingly, even a visually-handicapped user can perceive the function or state of an operating element in advance. In checking an operating element, the user does not actually operate the operating element, so no undesired change of state of the electronic apparatus occurs.

The electronic apparatus can further comprise a selecting device configured to select one from among a plurality of modes, wherein the notification device performs notification through voice of a type different for each mode selected by the selecting device.

With the construction of the preferred embodiment of the present invention, the function of the operating element or the state corresponding to the operating element is notified through voice of a type different for each selected mode. Accordingly, at least one of, for example, sound quality, language and notification content can be changed for each mode.

To attain the above object, in a fourth aspect of the present invention, there is provided a computer-readable storage medium including a program for causing a computer to execute a control method of controlling an electronic apparatus, the method comprising a reading step of causing a RFID reading device including a RFID reader antenna arranged in the vicinity of at least one operating element to read an ID stored in a RF tag approached by the operating element, and a notification step in which, when an operator makes a RF tag mounted in a predetermined portion of the human body operating the operating element approach the operating element and then the RFID reading device reads an ID stored in the RF tag, the function of the operating element or the state corresponding to the operating element is notified to the operator through voice in accordance with the read ID.

With the arrangement of the computer-readable storage medium according to the fourth aspect of the present invention, the same effects as those obtained by the electronic apparatus according to the first aspect can be obtained.

To attain the above object, in a fifth aspect of the present invention, there is provided a computer-readable storage medium including a program for causing a computer to execute a control method of controlling an electronic apparatus, the method comprising a reading step of causing one RFID reader to scan on a time-division basis each of a plurality of RFID reader antennas provided in each of a plurality of operating elements and thereby reading the operating element approached by a RF tag and IDs stored in the RF tag.

With the arrangement of the computer-readable storage medium according to the fifth aspect of the present invention, the same effects as those obtained by the electronic apparatus according to the second aspect can be obtained.

To attain the above object, in a sixth aspect of the present invention, there is provided a computer-readable storage medium including a program for causing a computer to execute a control method of controlling an electronic apparatus, the method comprising a reading step of causing a RFID reading device including a RFID reader antenna mounted in a predetermined portion of the human body operating at least one operating element provided with a RF tag to read an ID stored in the RF tag included in the operating element, when the RFID reading device approaches the operating element, and a notification step in which, when an operator makes the RFID reading device approach the operating element and then the RFID reading device reads the ID stored in the RF tag, the function of the operating element or the state corresponding to the operating element is notified to the operator through voice in accordance with the read ID.

With the arrangement of the computer-readable storage medium according to the sixth aspect of the present invention, the same effects as those obtained by the electronic apparatus according to the third aspect can be obtained.

The above and other objects, features, and advantages of the invention will become more apparent from the following detailed description taken in conjunction with the accompanying drawings.

BRIEF DESCRIPTION OF THE DRAWINGS

FIG. 1 is a block diagram showing the schematic construction of an electronic musical instrument to which is applied an electronic apparatus according to an embodiment of the present invention.

FIG. 2 is a view showing how the tone color selecting switches included in the setting operating element shown in FIG. 1 and their vicinities are arranged.

FIG. 3 is a block diagram for explaining the control process executed by the electronic musical instrument of FIG. 1.

FIG. 5 is a view showing how tone color selecting switches of a variation 2 obtained by partially modifying the construction of the electronic musical instrument of FIG. 1 and the vicinities of the tone color selecting switches are arranged.

DETAILED DESCRIPTION OF THE PREFERRED EMBODIMENTS

Figure 2A:
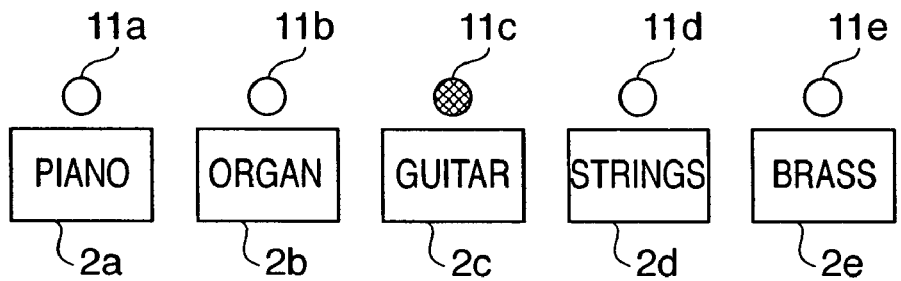
FIG. 2A is a plan view of the tone color selecting switches and their vicinities.

The present invention will be described in detail below with reference to the drawings showing preferred embodiments thereof.

FIG. 1 is a block diagram showing the schematic construction of an electronic musical instrument to which is applied an electronic apparatus according to an embodiment of the present invention.

As shown in FIG. 1, the electronic musical instrument according to the present embodiment is comprised of performance operating elements 1 including a keyboard for inputting pitch information, setting operating elements 2 including a plurality of switches, a wheel and a joystick for inputting various types of information, a RFID antenna group 3 composed of a plurality of RFID (Radio Frequency Identification) antennas arranged respectively in the vicinity of at least one part of the operating elements (five tone color selecting switches in the present embodiment), a detecting circuit 4 that detects operative states of the performance operating elements 1, a detecting circuit 5 that detects operative states of the setting operating element 2, a RFID reader 6 that reads content (ID) stored in RF tag via the RFID antenna group 3, a CPU 7 that controls the entire apparatus, a ROM 8 having stored therein control programs executed by the CPU 7, various types of table data and the like, a RAM 9 having temporarily stored therein musical composition data, various types of input information, calculation results and the like, a timer 10 that measures an interrupt time for timer interrupt processing and various types of time periods, a display 11, including, for example, a liquid crystal display (LCD) and light emitting diode (LED), and displaying various types of information, an external storage device 12 having stored therein various types of application programs including the control programs, various types of musical composition data, various types of data and the like, a MIDI interface (I/F) 13 for inputting MIDI messages from external devices and outputting MIDI messages to external devices, a communication interface (I/F) 14 for transmitting/receiving via a communication network 101 data to/from, for example, a server computer (abbreviated as a "server" hereinafter), a tone generator circuit 15 that converts into audio signals, performance data input from the performance operating elements 1 or preset musical composition data, an effect circuit 16 for applying various types of effects to audio signals from the tone generator circuit 15, and a sound system 17, including, for example, a DAC (Digital-to-Analog Converter), an amplifier and a loudspeaker, and converting audio signals from the effect circuit 16 into sounds.

The above component elements 4 to 16 are connected to one another via a bus 18. The timer 10 is connected to the CPU 7, other MIDI equipment 100 to the MIDI I/F 13, the communication network 101 to the communication I/F 14, the effect circuit 16 to the tone generator circuit 15, and the sound system 17 to the effect circuit 16. Here, the communication I/F 14 and the communication network 101 should not necessarily be wired, but may be wireless. Alternatively, one may be wired and the other may be wireless.

The external storage device 12 may be implemented, for example, by a flexible disk drive (FDD), a hard disk drive (HDD), a CD-ROM drive, or a magneto-optical disk (MO) drive. The external storage device 12 may store the control programs executed by the CPU 7 as mentioned above. If one or more of the control programs are not stored in the ROM 8, the control program(s) may be stored in the external storage device 12, and by reading out the control program(s) from the external storage device 12 and storing the same in the RAM 9, the CPU 7 can operate in the same manner as if the control program(s) were stored in the ROM 8. This enables adding control programs and upgrading the version of the control programs with ease.

Figure 2B:
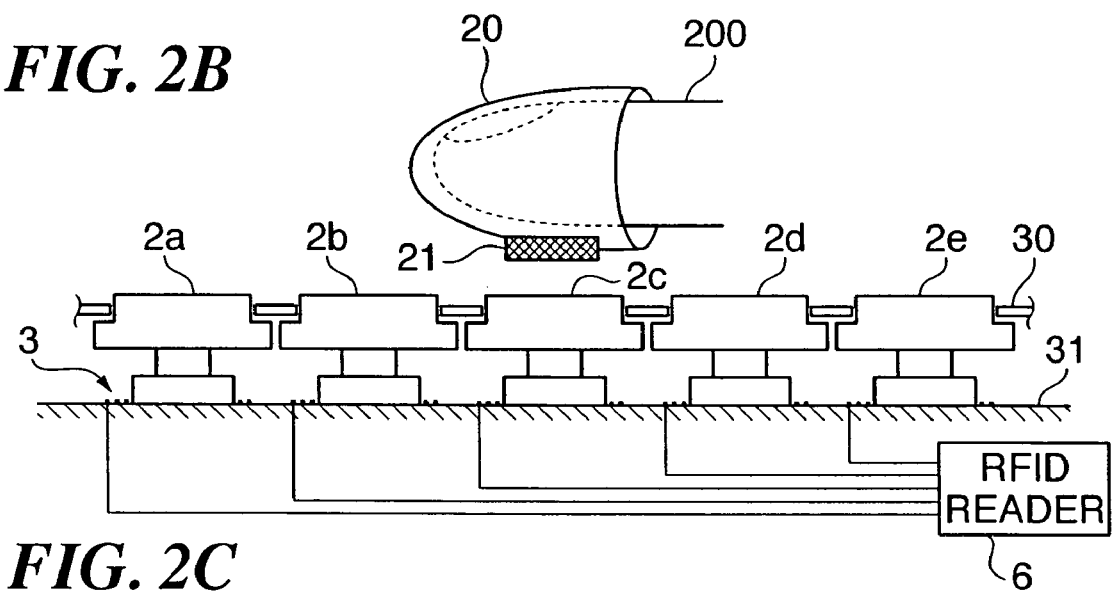
FIG. 2B is a cross-sectional view of the tone color selecting switches and their vicinities.
Figure 2C:
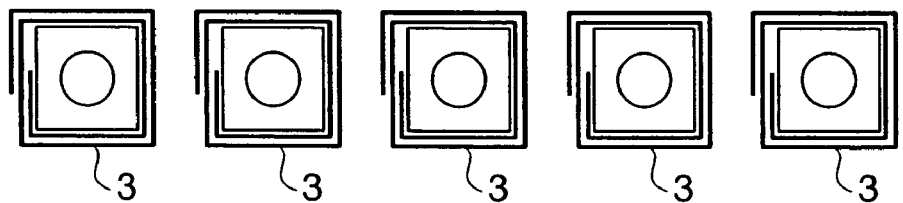
FIG. 2C is a plan view of the tone color selecting switches and their vicinities arranged on a substrate.

FIG. 2 is a view showing how the tone color selecting switches included in the setting operating element 2 and their vicinities are arranged. FIG. 2A is a plan view of the tone color selecting switches and their vicinities. FIG. 2B is a cross-sectional view of the tone color selecting switches and their vicinities. FIG. 2C is a plan view of the tone color selecting switches and their vicinities arranged on a substrate.

As shown in FIG. 2A, the electronic musical instrument according to the present embodiment is provided with five kinds of tone color selecting switches 2a to 2e. In the vicinity of these tones color selecting switches 2a to 2e, there are arranged LEDs 11a to 11e, respectively. Each of the LEDs 11a to 11e indicates the operative state of the tone color selecting switches 2a to 2e corresponding thereto. In the illustrated example, the LED 11c corresponding to the guitar tone color selecting switch 2c is emitting light. Accordingly, the user (operator) can perceive the current operative state of the electronic musical instrument of the present embodiment; that is, the guitar tone color selecting switch 2c is on the ON state, and the guitar tone color has been selected.

As shown in FIGS. 2B and 2C, on a substrate 31 having arranged thereon the tone color selecting switches 2a to 2e, there is arranged the RFID antenna group 3 constituted of a plurality of antennas surrounding the tone color selecting switches 2a to 2e, respectively. Each of the plurality of antennas constituting the RFID antenna group 3 is connected to the RFID reader 6.

In FIG. 2B, there is also illustrated a finger attachment 20 for attaching a RF tag 21 to a user's finger 200.

The control process executed by the electronic musical instrument having the above described construction will be schematically described with reference to FIG. 2 and then described in detail with reference to FIG. 3.

The RFID reader 6 sequentially supplies a signal of a predetermined frequency to the respective antennas constituting the RFID antenna group 3 for a predetermined length of time on a time-division basis, and thereby causes each antenna to generate electromagnetic wave containing a control signal for a predetermined length of time. When the user makes the finger attachment 20 attached to the user's finger 200 approach one of the tone color selecting switches 2a to 2e, an antenna (not shown) of the RF tag 21 attached to the finger attachment 20 receives electromagnetic wave generated from the antenna close to the approached tone color selecting switch. Then, electromotive force is generated in the antenna of the RF tag 21 by resonance effect in antenna (electromagnetic induction or the like); the generated electric power turns on a circuit arranged in the RF tag 21. Then, the circuit performs predetermined processings. Here, the predetermined processings performed by the circuit includes, for example, a processing of reading an ID (user ID) written into the RF tag and then transmitting the read ID from the antenna of the RF tag 21 by use of modulated carrier wave. When the electromagnetic wave carrying the user ID is thus transmitted from the antenna of the RF tag 21, one antenna (one of the antennas included in the RFID antenna group 3) closest to the finger attachment 20 receives this electromagnetic wave, converts it to an electric signal and supplies the electric signal to the RFID reader 6. The RFID reader 6 decodes the supplied electric signal, and stores the user ID being the decode result into an ID storage area (not shown) allocated in a predetermined position of the above RAM 9. Also, the RFID reader 6 can perceive which antenna of the antennas of the RFID antenna group 3 has been scanned (i.e., the predetermined-frequency signal has supplied to which antenna of the antennas of the RFID antenna group 3) when the decoded user ID is obtained; accordingly, the antenna number attached to that antenna is easily detected, and this antenna number is also stored in the ID storage area along with the obtained user ID. As described above, one antenna is provided for each tone color selecting switch; therefore, detection of an antenna number means detection of a tone color selecting switch that the user makes the finger attachment 20 approach.

First, the CPU 7 selects according to the user ID stored in the ID storage area and a notification mode selected from a plurality of notification modes, one content for each item: (1) information type, (2) language, (3) tone quality and (4) expression. Subsequently, the CPU 7 accesses a voice guide database (not shown) constructed in the external storage device 12 to read voice guide data uniquely determined in accordance with the selected content of the items (1) to (4), the antenna number stored in the ID storage area and the current operative state of the tone color selecting switch indicated by this antenna number. Then, the read voice guide data is converted into an audio signal by the tone generator circuit 15 or an audio decoder circuit (not shown); voice corresponding to the audio signal obtained by the conversion is generated from the sound system 17.

In this manner, to cause a voice guide related to a tone color selecting switch to be generated, all that is required of the user is that the user makes the finger attachment 20 approach one of the tone color selecting switches 2a to 2e. Consequently, even a visually-handicapped user can perceive the function and state of the tone color selecting switches in advance.

The control process will now be described in detail.

FIG. 3 is a block diagram for explaining the control process executed by the electronic musical instrument according to the present embodiment.

As described above, the RFID reader 6 scans the respective antennas constituting the RFID antenna group 3 on a time-division basis (block B1). Then, when one of the antennas of the RFID antenna group 3 receives electromagnetic wave from the RF tag 21, this antenna converts the received electromagnetic wave into an electric signal and transmits the signal to the RFID reader 6. The RFID reader 6 analyzes the signal transmitted from the antenna, acquires a user ID contained in the signal, and stores the user ID into the ID storage area (block B2). Also, the RFID reader 6 associates the antenna number of the antenna from which the user ID has been acquired, with the acquired user ID and stores the antenna number into the ID storage area (block B1).

Independently of such antenna scanning processing and RFID read processing, the detecting circuit 5 scans the tone color selecting switches 2a to 2e to detect the operative state of the switches (block B5). It is noted that, in practice, the switch scanning by the detecting circuit 5 is also performed with respect to operating elements included in the setting operating element 2 other than the tone color selecting switches 2a to 2e, but in the present embodiment, the present invention is described by taking as an example, the tone color selecting switches 2a to 2e included in the setting operating element 2; therefore, only the switch scanning with respect to the tone color selecting switches 2a to 2e is illustrated here.

The detecting circuit 5 detects a switch having the operative state changed, from among the tone color selecting switches 2a to 2e, and then stores the switch number attached to the detected switch into a switch buffer (not shown) allocated in a predetermined position of the RAM 9 (block B5).

The CPU 7 checks the switch buffer at all times, and when a switch number is stored into the switch buffer, the CPU 7 performs a processing for the switch corresponding to the switch number (block B6). More specifically, for example, when the guitar tone color selecting switch 2c (the switch number being "3") is operated, the detecting circuit 5 stores "3" into the switch buffer. When it is detected that "3" has been stored in the switch buffer, if it is currently in a state in which the tone color setting in the electronic musical instrument is not the guitar tone color and also the tone color setting can be changed to the guitar tone color, then the CPU 7 instructs the tone generator circuit 15 to change the tone color setting to the guitar tone color and at the same time, as shown in FIG. 2A, causes the LED 11c close to the tone color selecting switch 2c to turn on. Thereafter, when the player (user) plays on the performance operating elements 1, musical tones of the guitar tone color is generated from the sound system 17 (block B7). The setting operating element 2 also includes a mode change switch (not shown) for changing the operating mode; when the mode change switch is operated, the CPU 7 changes the operating mode (including the above described notification mode).

When the user desires to obtain information on the tone color selecting switches 2a to 2e, even if one tone color selecting switch on which information is to be obtained is selected, the information desired by the user is not necessarily determined uniquely. This is because a plurality of information can be associated with one tone color selecting switch; more specifically, the plurality of information includes the function assigned to the tone color selecting switch and the operative state thereof. Depending on the user, desired information varies: the function, the operative state or both thereof. Accordingly, in the present embodiment, there are provided three types of notification modes: function notification mode, state notification mode and function & state notification mode. The user can select one from among these modes. The above described "(1) information type" means an information type which the user desires to obtain from the tone color selecting switches 2a to 2e; the user preliminarily selects one from among the above three notification modes.

The above described "(2) language" means a language used when the guide voice is generated; in the present embodiment, guide voices corresponding respectively to a plurality of languages (for example, English and Japanese) are prepared. Similarly to the above described (1) information type, it is possible to provide language modes corresponding to each language so that the user can select one from among them. However, when configured in this manner, there are too many modes to be selected by the user; thus, in the present embodiment, one language is uniquely selected based on the user ID stored in the RF tag 21. That is, an arrangement is made so that the nationality of the user is determined based on the user ID (i.e., the user ID is preliminarily associated with the nationality), and the language used in that country is uniquely selected. Alternatively, irrespective of the nationality, the user ID may be preliminarily associated with one language.

The above described "(3) tone quality" means voice quality used when the guide voice is generated; in the present embodiment, one can be selected from among male voice and female voice. From the reason similar to that of the selection of (2) language described above, this selection is also uniquely made based on the user ID stored in the RF tag 21. For example, an arrangement is made so that the gender of the user is determined from the user ID (i.e., the user ID is preliminarily associated with the gender); the voice quality of the gender opposite to (or similar to) that of the user is uniquely selected. Alternatively, irrespective of the gender, the user ID may be preliminarily associated with one tone quality.

The above described "(4) expression" means an expression type of guide voice; in the present embodiment, the degree of detail of notification content can be selected. From the reason similar to that of the selection of (2) language described above, this selection is also uniquely made based on the user ID stored in the RF tag 21. For example, an arrangement is made so that the age and the years of experience on the electronic musical instrument are determined from the user ID (i.e., the user ID is preliminarily associated with the age and the years of experience), and the degree of detail of notification content is uniquely selected according to the age and the years of experience. Alternatively, irrespective of the age and the years of experience, the user ID may be preliminarily associated with the degree of detail of notification content.

In this manner, according to the present embodiment, only the item (1) information type is preliminarily selected by the user, and the other items (2) to (4) are uniquely selected from the user ID. When the content of the four types of items (1) to (4) is determined and the intended tone color selecting switch (to which a voice guide is to be given) and the current set state of this tone color selecting switch are determined, then the guide voice is uniquely determined. That is, the voice guide database constructed on the external storage device 12 is configured so that, when the content of items (1) to (4) is determined and the intended tone color selecting switch and the current setting state of this tone color selecting switch are determined, then one piece of voice guide data is retrieved. In other words, the voice guide database is composed of voice guide data of a number obtained by multiplying together the number of types of selectable contents with respect to each item (1) to (4), the number of tone color selecting switches and the number of setting states with respect to each tone color selecting switch. According to the present embodiment, selection is made from among three types with respect to the item (1), from among two types with respect to the item (2), from among two types with respect to the item (3) and from among two types with respect to the item (4), and further there are five kinds of tone color selecting switches and two types of set states with respect to each tone color selecting switch; therefore, the voice guide database has at least a number $3\times2\times2\times2\times5\times2$ (=240) of voice guide data.

The CPU 7 specifies from the user ID stored in the ID storage area the user's specific information, more specifically, the nationality, gender, age and the like and the relationship between each item (2) to (4), and also specifies from the antenna number stored in the ID storage area the tone color selecting switch that the user makes the finger attachment 20 approach, and further specifies the current state of that tone color selecting switch (block B3).

Then, the CPU 7 selects the content of each item (1) to (4) based on the specified user's specific information and the notification mode being currently set, and retrieves from the voice guide database, guide voice data corresponding to the selected content of each item, the tone color selecting switch and the state of the tone color selecting switch, and causes guide voice corresponding to this guide voice data to be generated via the tone generator circuit 15 or audio decoder circuit, and the sound system 17 (block B4).

For example, when a Japanese male user having many years of experience on the electronic musical instrument makes the finger attachment 20 approach the guitar tone color selecting switch 2c while one of (a) "function notification mode", (b) "state notification mode" and (c) "function & state notification mode" has been selected, then one of the following messages (voice guide data) is retrieved from the guide voice database and generated from the sound system 17 through female voice.

(a) "It is the guitar tone color selecting switch"
(b) "The guitar tone color is currently selected"
(c) "It is the guitar tone color selecting switch. The guitar tone color is currently selected"

Meanwhile, when the same user makes the finger attachment 20 approach the piano tone color selecting switch 2a while one of (a) "function notification mode", (b) "state notification mode" and (c) "function & state notification mode" has been selected, then one of the following messages retrieved from the guide voice database and generated from the sound system 17 through female voice.

(a) "It is the piano tone color selecting switch"
(b) "The piano tone color is currently selected"
(c) "It is the piano tone color selecting switch. The piano tone color is currently selected"

Also, when a female user being a beginner at the electronic musical instrument makes the finger attachment 20 approach the guitar tone color selecting switch 2c while "function notification mode" has been selected, then a message "when this switch is depressed, the tone color of the keyboard changes to the guitar tone color" is retrieved from the guide voice database and generated from the sound system 17 through male voice.

All selections with respect to the items (1) to (4) may be made from the user ID, or may be made by the modes. Alternatively, selections with respect to part (two or more items) of the items may be made from the user ID and selections with respect to the remaining items may be made by the modes. Further, the number of items and the contents are not limited to the above described ones.

Also, according to the present embodiment, the voice guide data is retrieved and read from data preliminarily stored in the voice guide database, but the CPU 7 may create the voice guide data in accordance with the selected contents with respect to the items (1) to (4), the intended tone color selecting switch and the state thereof.

In this manner, according to the present embodiment, to check the function and/or the state of an operating element through voice, all that is required of the user is that the user makes an operating portion (for example, a finger) operating the operating element approach the operating element. Accordingly, even a visually-handicapped user can perceive the function of the operating element and/or the state thereof in advance. Since the user does not actually operate the operating element in checking it, no undesired change of state of the electronic musical instrument occurs.

Also, the user ID stored in the RF tag is identified to give a guide through voice of a mode different for each user ID, so the tone quality, language and notification content can be changed for each user. Further, a plurality of modes are provided; a guide is given through voice of a different type in accordance with the mode. Accordingly, the tone quality, language and notification content can be changed for each user.

Also, one RFID reader scans a plurality of antennas constituting the RFID antenna group on a time-division basis, whereby the RF tag is detected at positions corresponding to each operating element. As a result, using one RFID reader, the RF tag can be detected at respective positions corresponding to a plurality of operating elements, thereby allowing simplification of the device construction.

Figure 4:
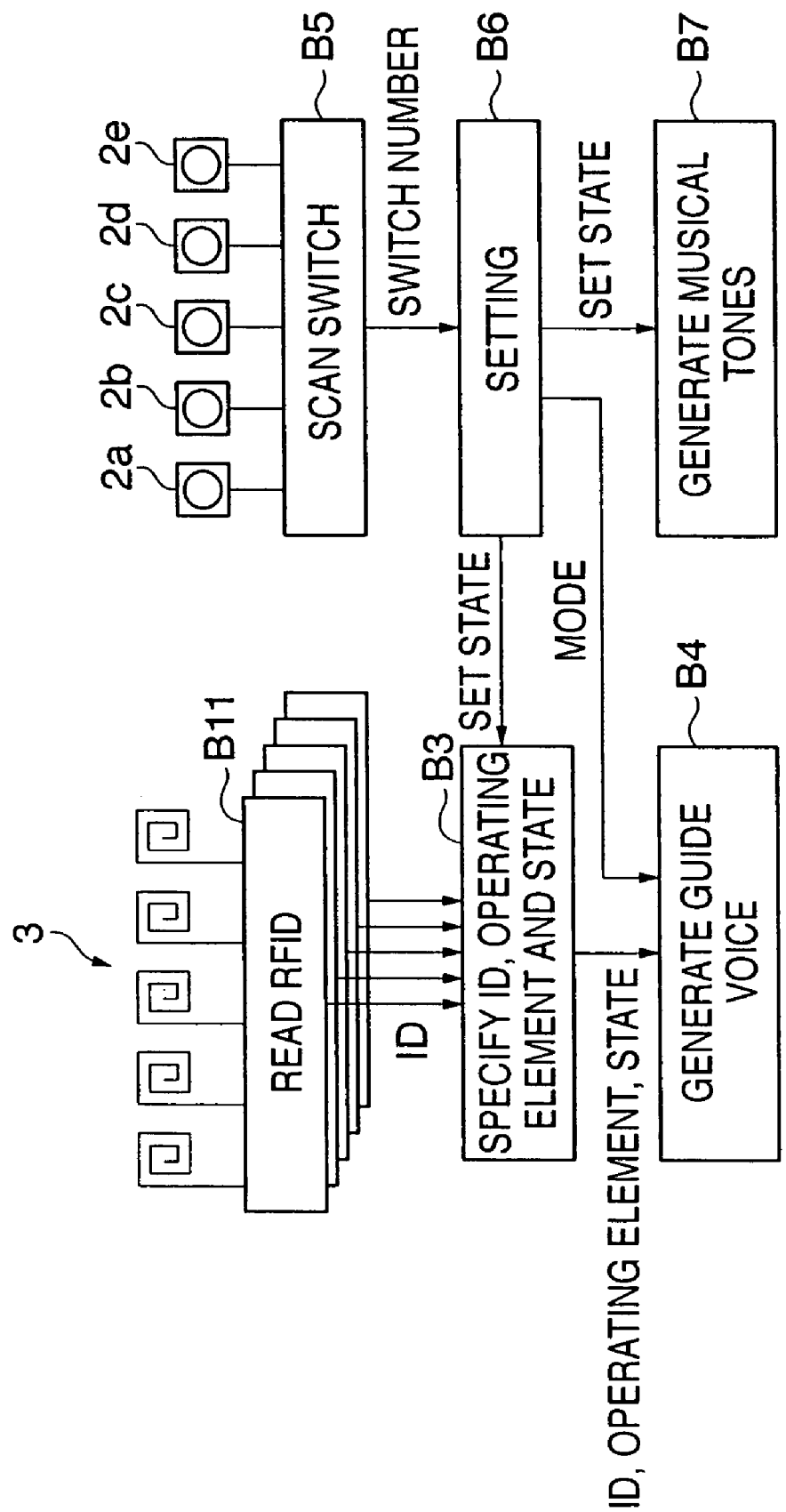
FIG. 4 is a block diagram for explaining the control process executed by a variation 1 obtained by partially modifying the construction of the electronic musical instrument of FIG. 1.

FIG. 4 is a block diagram for explaining the control process executed by a variation 1 obtained by partially modifying the construction of the electronic musical instrument according to the present embodiment.

The difference of this variation 1 from the electronic musical instrument of the above embodiment is that there are provided RFID readers (block B11) of the same number as that of antennas constituting the RFID antenna group 3. When configured in this manner, the RFID reader does not need to scan each antenna on a time-division basis, and thus the control process of the RFID reader can be simplified. However, since the RFID readers of the same number as that of antennas must be provided, fabrication cost will increase.

The process performed after the RFID readers have acquired the user ID is similar to that of the above embodiment and hence an explanation thereof is omitted.

Figure 5A:
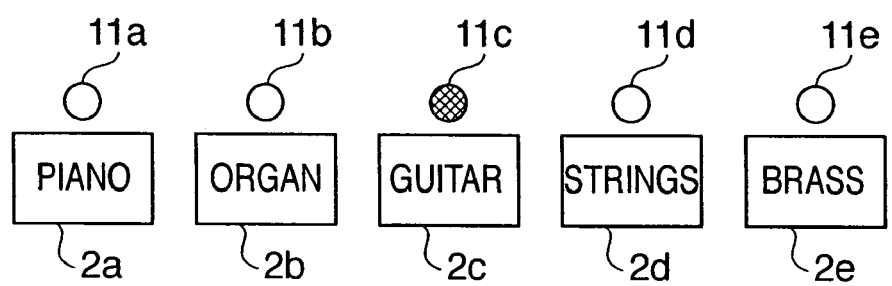
FIG. 5A is a plan view of the tone color selecting switches and their vicinities.

FIG. 5 is a view showing how tone color selecting switches of a variation 2 obtained by partially modifying the construction of the electronic musical instrument of the present embodiment and the vicinities of the tone color selecting switches are arranged.

Figure 5B:
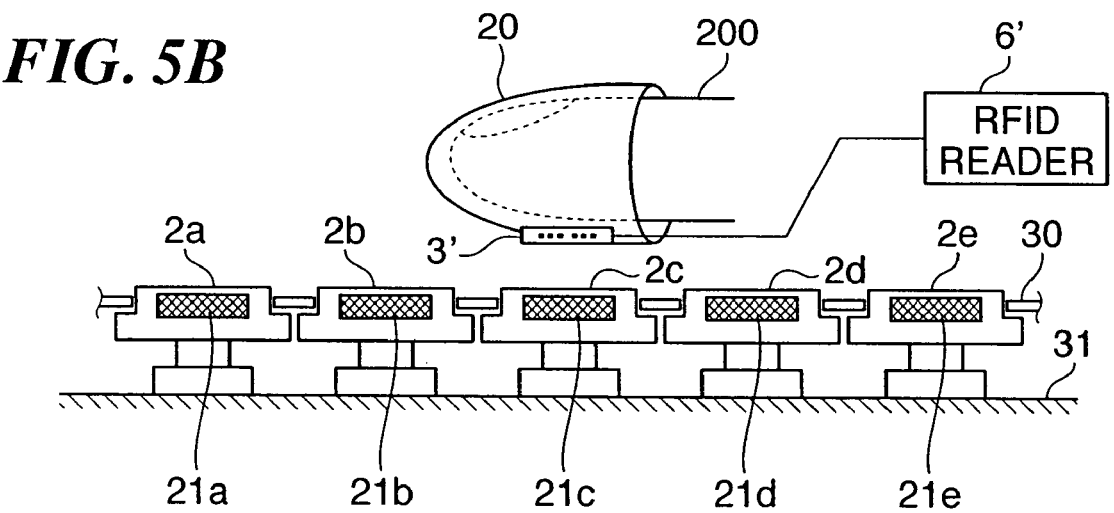
FIG. 5B is a cross-sectional view of the tone color selecting switches and their vicinities.

As shown in FIG. 5B, this variation 2 is different from the electronic musical instrument of the above embodiment in that a RFID antenna 3' is arranged in the finger attachment 20 side, and RF tags 21a to 21e are arranged within the tone color selecting switches 2a to 2e, respectively. In the respective RF tags 21a to 21e, there are stored IDs indicating the tone color selecting switches corresponding thereto.

Figure 6:
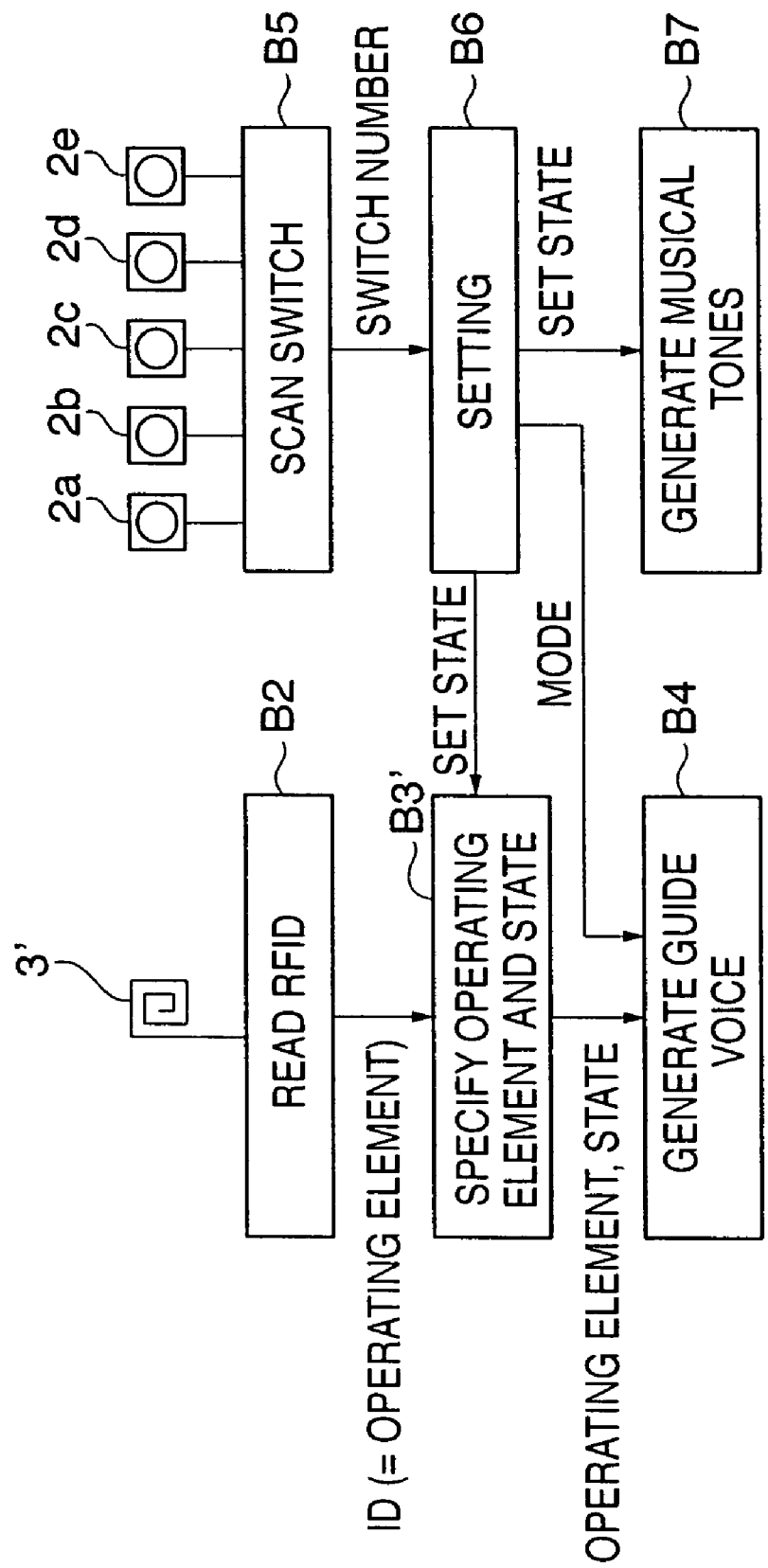
FIG. 6 is a block diagram for explaining the control process executed by the variation 2.

FIG. 6 is a block diagram for explaining the control process executed by this variation 2.

As shown in FIG. 6, the RFID reader 6' acquires an ID written in the RF tag of a tone color selecting switch that the user makes the finger attachment 20 approach (block B2). The ID acquired at this time indicates, as described above, a tone color selecting switch; as with the above embodiment, the acquired ID does not indicate a user ID. Consequently, the CPU 7 cannot select the contents of the items (1) to (4) based on the user ID. That is, when selecting the contents of the items (1) to (4), similarly to the above embodiment, a plurality of modes must be provided for each item, and the user must select one of the plurality of modes for each item in advance. When configured in this manner, the voice guide can be given, similarly to the above embodiment.

In this manner, according to this variation 2, also, to check the function and/or the state of an operating element through voice, all that is required of the user is that the user makes an operating portion (for example, a finger) operating the operating element approach the operating element. Accordingly, even a visually-handicapped user can perceive the function of the operating element and/or the state thereof in advance. Since the user does not actually operate the operating element in checking it, no undesired change of state of the electronic musical instrument occurs.

Also, a plurality of modes are provided; a guide is given through voice of a different type in accordance with the mode. Accordingly, the tone quality, language and notification content can be changed for each user.

In the present embodiment and the variations thereof, the present invention is applied to an electronic musical instrument. However, the present invention can be applied to any device, as long as the device has many operating elements or has operating elements the state of which changes. And the type of functions assigned to the operating elements in a fixed or variable manner, and the type of state of the operating elements can be arbitrarily selected.

Also, the configuration (shape) of the operating element is not limited to that of a switch, and may be that of a rotary operating element (a rotary encoder, a rotary volume: in an electronic musical instrument, a rotary knob, a pitch bend wheel and the like), a slide operating element (a slide encoder, a slide volume: in an electronic musical instrument, a sound volume slider and the like), or a performance operating element (a keyboard, a drum pad and the like).

Also, the content of voice guide is not limited to the above exemplary ones. As for the type of voice changed for each ID (each user), all of the sound quality, language, and notification content do not need to be provided, and it is sufficient to provide one or more types. Alternatively, any type other than these may be used. Also, the notification mode is not limited to the three types: function alone, state alone, and function & state. Also, voice may be output from a loudspeaker or output to a headphone. When voice is output to a headphone, anyone else does not hear the content, which is convenient. Also, only the guide voice may be output from a headphone and at the same time, sound (in an electronic musical instrument, playing sound) ordinarily generated by the electronic musical instrument may be output from a loudspeaker.

Any scheme of RFID may be used, such as one using electromagnetic induction, microwave or the like. In this case, an operating element must be specified, so it is desirable to use a scheme which permits only short distance communication and has narrow directivity so that no interference with RFID corresponding to an adjacent operating element occurs.

Further, the operating portion is not limited to a finger, and the leg, the entire arm or the like can be used. Needless to say, the attachment configuration varies according to the operating portion. Examples include hand-held one and glove shaped one.

It is to be understood that the object of the present invention may also be accomplished by supplying a system or an apparatus with a storage medium in which a program code of software, which realizes the functions of any of the above described embodiment is stored, and causing a computer (or CPU or MPU) of the system or apparatus to read out and execute the program code stored in the storage medium.

In this case, the program code itself read from the storage medium realizes the functions of any of the above described embodiment, and hence the program code and a storage medium on which the program code is stored constitute the present invention.

Examples of the storage medium for supplying the program code include a floppy(registered trademark) disk, a hard disk, a magneto-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program code may be downloaded from a server computer via a communication network.

Further, it is to be understood that the functions of any of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiment may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. An electronic apparatus comprising:
   at least one operating element;
   a RFID reading device including a RFID reader antenna arranged in the vicinity of the operating element; and
   a notification device by which, when an operator makes a RF tag approach the operating element and then the RFID reading device reads an ID stored in the RF tag, a function of the operating element or a state corresponding to the operating element is notified to the operator through voice in accordance with the read ID, wherein the RF tag is mounted in a predetermined portion of a human body operating the operating element.

2. The electronic apparatus according to claim 1, wherein the notification device performs notification through voice of a type different for each read ID.

3. The electronic apparatus according to claim 1, further comprising a selecting device configured to select one from among a plurality of modes, wherein the notification device performs notification through voice of a type different for each mode selected by the selecting device.

4. The electronic apparatus according to claim 1, further comprising a selecting device configured to select one from among a plurality of modes, wherein the notification device notifies through voice one of the function of the operating element, the state corresponding to the operating element, and both thereof in accordance with the mode selected by the selecting device.

5. The electronic apparatus according to claim 1, further comprising a selecting device configured to select one from among a plurality of modes, wherein the notification device performs notification through voice with a degree of detail of notification content different for each mode selected by the selecting device.

6. The electronic apparatus according to claim 1, wherein the electronic apparatus is an electronic musical instrument, and the operating element is at least one of a tone color selecting operating element, a rotary operating element, a slide operating element and a performance operating element.

7. An electronic apparatus comprising:
at least one operating element provided with a RF tag;
a RFID reading device including a RFID reader antenna mounted in a predetermined portion of a human body operating the operating element; and
a notification device by which, when an operator makes the RFID reading device approach the operating element and then the RFID reading device reads an ID stored in the RF tag included in the operating element, a function of the operating element or a state corresponding to the operating element is notified through voice to the operator in accordance with the read ID.

8. The electronic apparatus according to claim 7, further comprising a selecting device configured to select one from among a plurality of modes, wherein the notification device performs notification through voice of a type different for each mode selected by the selecting device.

9. The electronic apparatus according to claim 7, further comprising a selecting device configured to select one from among a plurality of modes, wherein the notification device notifies through voice one of the function of the operating element, the state corresponding to the operating element, and both thereof in accordance with the mode selected by the selecting device.

10. The electronic apparatus according to claim 7, further comprising a selecting device configured to select one from among a plurality of modes, wherein the notification device performs notification through voice with a degree of detail of notification content different for each mode selected by the selecting device.

11. The electronic apparatus according to claim 7, wherein the electronic apparatus is an electronic musical instrument, and the operating element is at least one of a tone color selecting operating element, a rotary operating element, a slide operating element and a performance operating element.

12. A computer-readable storage medium including a program for causing a computer to execute a control method of controlling an electronic apparatus, the method comprising:
a reading step of causing a RFID reading device including a RFID reader antenna arranged in the vicinity of at least one operating element to read an ID stored in a RF tag approached by the operating element; and
a notification step in which, when an operator makes a RF tag approach the operating element and then the RFID reading device reads an ID stored in the RF tag, a function of the operating element or a state corresponding to the operating element is notified to the operator through voice in accordance with the read ID, wherein the RF tag is mounted in a predetermined portion of a human body operating the operating element.

13. A computer-readable storage medium including a program for causing a computer to execute a control method of controlling an electronic apparatus, the method comprising:
a reading step of causing a RFID reading device including a RFID reader antenna mounted in a predetermined portion of a human body operating at least one operating element provided with a RF tag to read an ID stored in the RF tag included in the operating element, when the RFID reading device approaches the operating element; and
a notification step in which, when an operator makes the RFID reading device approach the operating element and then the RFID reading device reads the ID stored in the RF tag, a function of the operating element or a state corresponding to the operating element is notified to the operator through voice in accordance with the read ID.

* * * * *